US006108418A

United States Patent [19]

Turner

[11] Patent Number: 6,108,418

[45] Date of Patent: Aug. 22, 2000

[54] CIRCUMFERENTIAL-CONTACT PHONE JACK SOCKET

[76] Inventor: Robert A. Turner, 209 Bassett St., Petaluma, Calif. 94952

[21] Appl. No.: 09/021,227

[22] Filed: Feb. 10, 1998

Related U.S. Application Data

[63] Continuation of application No. 08/587,288, Jan. 16, 1996, Pat. No. 5,486,059.

[51] Int. Cl.[7] .................................................. H04M 1/00

[52] U.S. Cl. ......................................... 379/438; 379/437

[58] Field of Search .................................. 379/438, 437; 439/13, 65, 577

[56] References Cited

U.S. PATENT DOCUMENTS 4,533,796 8/1985 Engelmore .............................. 379/438

*Primary Examiner*—Jack Chiang
*Attorney, Agent, or Firm*—Ian Hardcastle

[57] ABSTRACT

A jack socket that comprises a body that defines an axial bore adapted to receive a phone jack, and an annular groove at each of at least two axially-spaced locations along the axial bore. Each annular groove is concentric with, perpendicular to, and faces into, the axial bore. The jack socket additionally comprises an annular spring member corresponding to each annular groove. The annular spring member includes a radially-outer portion housed in the annular groove and a radially-inner portion extending into the axial bore. Finally, the jack socket comprises an electrical connection through the body to each annular spring member.

8 Claims, 8 Drawing Sheets

CIRCUMFERENTIAL-CONTACT PHONE JACK SOCKET

PRIOR APPLICATION

This application is a continuation of U.S. patent application Ser. No. 08/587,288, filed on Jan. 16, 1996, the entire disclosure of which incorporated herein by reference now U.S. Pat. No. 5,486,059.

FIELD OF THE INVENTION

The invention relates to connectors for electrical signals, and, in particular, to a socket for ¼-inch (6.25 mm) jack plugs.

BACKGROUND OF THE INVENTION

The ¼-inch (6.25 mm) phone jack has become almost standardized as a signal connector for electrical musical instruments, such as electric guitars, electric keyboards and the like, and in many other applications. Despite the widespread use of such connectors, the performance and reliability of current ¼-inch phone jack sockets is not satisfactory. Also, such phone jack sockets can be difficult to replace after they have failed or become noisy.

Current ¼-inch phone jack sockets used in electrical musical instruments typically have a molded plastic body with an axial bore dimensioned to receive the jack plug. A number of elongate spring contact strips of different lengths are mounted in the body, each at a different point on the circumference of the bore. The contact strips lie along the axis and pass through axial slots in the rear face of the body. Each contact strip is anchored in the body part-way along its length by the axial slot. The end of the contact strip remote from the anchored end is bent in a complex profile to enable the contact strip to form a point contact with the jack plug and to ride over the surface of the jack plug as the latter is inserted into the jack socket. The contact strips are spring loaded towards the axis to enable them to form a positive contact with the jack plug. The contact strip must apply a substantial lateral force to the jack plug to reduce the electrical resistance of the contact between the contact strip and the jack plug despite the small area of contact between the contact strip and the jack plug.

The axial bore in the body of the jack socket is usually made generously large to reduce the force required to insert the jack plug against the friction resulting from the pressure that the contact strips exert on the jack plug. However, after the jack plug has been inserted, it is normally subject to both static and dynamic loads. The weight of the cable connected to the jack plug imposes a load on the jack plug in the direction perpendicular to the axial bore. This causes the jack plug to pitch relative to the jack socket about an axis perpendicular to the axial bore. With a sufficient load, and especially when the contact strips have lost some of their resilience, the jack plug can pitch sufficiently to break the contact between it and at least one of the contact strips. Even if the contact is not actually broken, the force between the contact strip and the jack plug can be reduced to such an extent that noise will be generated in response to the dynamic loads imposed by the performer's movements.

Each contact strip forms an almost point contact with a point on the jack plug. The small area of the point contact makes it vulnerable to environmental contamination. Such contamination can occur, for example, when the musical instrument in which the jack socket is installed is played in high temperature, high humidity conditions. Contamination of the point contact between the contact strip and the jack plug can result in a non-ohmic electrical connection between these elements. The electrical connection could be insulating, rectifying, or galvanic, for example. A non-ohmic electrical connection will degrade the quality of the signal generated by the musical instrument. The possibility of the electrical connection being non-ohmic is increased when the lateral force between the contact strip and the jack plug is small.

Jack sockets traditionally have two contact strips. This is sufficient to provide a single output channel. Recently, many musical instruments have been adapted to generate signals in more than one output channel so that multi-channel effects can be produced. Also, many musical instruments are now fitted with battery-powered pre-amplifiers so that they can generate an output signal having a high signal-to-noise ratio even when they employ high-impedance transducers, or even when they are connected to their respective amplifiers by long cables. To prolong battery life, it is desirable that the pre-amplifier operate only when the jack is plugged into the jack socket. This prevents the pre-amplifier from drawing current from the battery while the instrument is not in use.

These developments have increased the number of contacts that must be provided by the jack socket. To provide two output channels, three contacts are required. To switch the pre-amplifier on automatically when the jack is plugged into the jack socket requires a fourth contact. Jack sockets with three contact strips are common, but the reliability problems discussed above are exacerbated if a fourth contact strip is included because the width of the contact strips must be reduced to enable the fourth contact strip fit in the fixed circumference of the bore. Reducing the width of the contact strip reduces the contact pressure that the contact strip can exert on the jack plug, and reduces the resistance of the contact strip to lengthways buckling when the jack plug is inserted.

Jack sockets are not only less reliable than is desirable, but also can be difficult to replace when they fail. Jack sockets are conventionally secured in a mounting hole by an external nut engaging with the body surrounding the axial bore, or are formed with a flange surrounding the axial bore and are secured by a nut engaging with threads on the back of the body. Because of this, replacing a failed jack socket requires access to both the inside face and the outside face bounding the mounting hole in which the jack socket is mounted.

For example, the jack socket is normally installed in an acoustic guitar by replacing the strap peg on the end of the guitar with a combined strap peg and jack socket. The jack socket is mounted in an approximately ½" (12.5 mm) diameter mounting hole made at the former location of the strap peg and extending through the end block of the guitar. A typical jack socket adapted for this application has a threaded portion on the front of the jack socket body surrounding the axial bore onto which is screwed a flanged strap peg. The jack socket is secured in the mounting hole in the guitar body by a hexagonal nut that screws onto a second threaded portion on the back of the jack socket body.

Installing such a jack socket requires access to the interior of the body of the guitar. This is required so that the wires that are to be connected to the jack socket can be threaded through the nut and washer that will be engaged with the threads on the back of the jack socket. This is also required so that the nut and washer can be threaded onto the back of the jack socket, the jack socket inserted into the mounting hole, and the jack socket held to prevent it from rotating while the strap peg is tightened up. This procedure involves working with one hand inserted through the sound hole into the body of the guitar. It also requires that the strings be removed so that the hand can be inserted into the sound hole. After the jack socket has been installed and the strings replaced, the guitar must then be completely re-tuned and, sometimes, re-voiced.

Accordingly, a jack socket is required that has greater reliability than currently-available jack sockets. A positive contact to the jack plug should be provided irrespective of the direction of any static load applied to the jack socket, and the positive contact should be maintained regardless of what dynamic loads are applied, for example, as a result of the movements of the performer. The positive contact should be maintained after hundreds of thousands of cycles of inserting and removing the jack plug. Further, a jack socket that is required that remains highly reliable even when as many as four contacts are provided. Finally, a jack socket is required that can easily be installed in a mounting hole without the need for more access to the rear of the mounting hole than is provided by the mounting hole itself.

SUMMARY OF THE INVENTION

The invention provides a jack socket for a phone jack. The jack socket comprises a body that defines an axial bore adapted to receive the phone jack, and an annular groove at each of at least two axially-spaced locations along the axial bore. Each annular groove is concentric with, perpendicular to, and faces into, the axial bore. The jack socket additionally comprises an annular spring member corresponding to each annular groove. The annular spring member includes a radially-outer portion housed in the annular groove and a radially-inner portion extending into the axial bore. Finally, the jack socket comprises an electrical connection through the body to each annular spring member.

In the jack socket according to the invention, the annular spring members provide a multiple-point circumferential electrical contact to the jack plug and subject the jack plug to a circumferentially-uniform compressive force. This ensures that the electrical connection to the jack plug is maintained over at least part of the circumference of the jack plug when the jack plug moves in the jack socket due to static loads, such as the weight of the cable attached to the jack plug, and due to dynamic loads, such as those imposed by movement of the performer.

The annular spring member may include a toroidal spring member that includes coils that are canted relative to the radius of the toroidal spring member.

The body may additionally define an access port extending through the body into each annular groove, and the electrical connection may comprise a printed circuit flex-board including connection fingers. One of the connection fingers extends through the access port into electrical contact with the radially-outer portion of the annular spring member located in each annular groove.

Each annular groove may have a curved wall, and the one of the connection fingers may be located between the curved wall of the annular groove and the radially-outer portion of the annular coil member located in the annular groove.

The invention also provides a jack socket capable of being installed in a mounting hole and that requires no more access to the back of the mounting hole during installation than is provided by the mounting hole itself. The jack socket comprises a body shaped and dimensioned to be closely received by the mounting hole. The body defines an axial bore accessible from outside the body. The axial bore includes a plug-receiving portion adapted to receive the phone jack, and a cavity arranged in tandem with, and accessible from, the plug-receiving portion. The body additionally defines radial bores extending radially outwards through the body from the cavity. The jack socket additionally comprises a ball slidably mounted in each of the radial bores, an axially-movable conical wedge located in the cavity, and a thin, conductive sleeve in which the body is mounted. The conical wedge has a conical surface that engages with the ball in each of the radial bores. The sleeve defines a sleeve hole aligned with each of the radial bores and having a diameter smaller than the diameter of the balls.

The jack socket may additionally comprise a first threaded element mounted in the body coaxially with the axial bore, and the conical wedge may include a second threaded element and a portion adapted to receive a torque via the axial bore. The second threaded element element with the first threaded element. The torque received via the axial bore rotates the conical wedge, which causes the threaded elements to move the conical wedge axially. Axial movement of the conical wedge causes the conical wedge to force the balls radially outwards into gripping engagement with the mounting hole.

DETAILED DESCRIPTION OF THE INVENTION

In the following description, the word "front" will be used to denote the part of the jack socket that provides access to the part of the axial bore into which the jack plug is inserted, and the word "rear" will be used to denote the part of the jack socket remote from the front.

Figure 1:
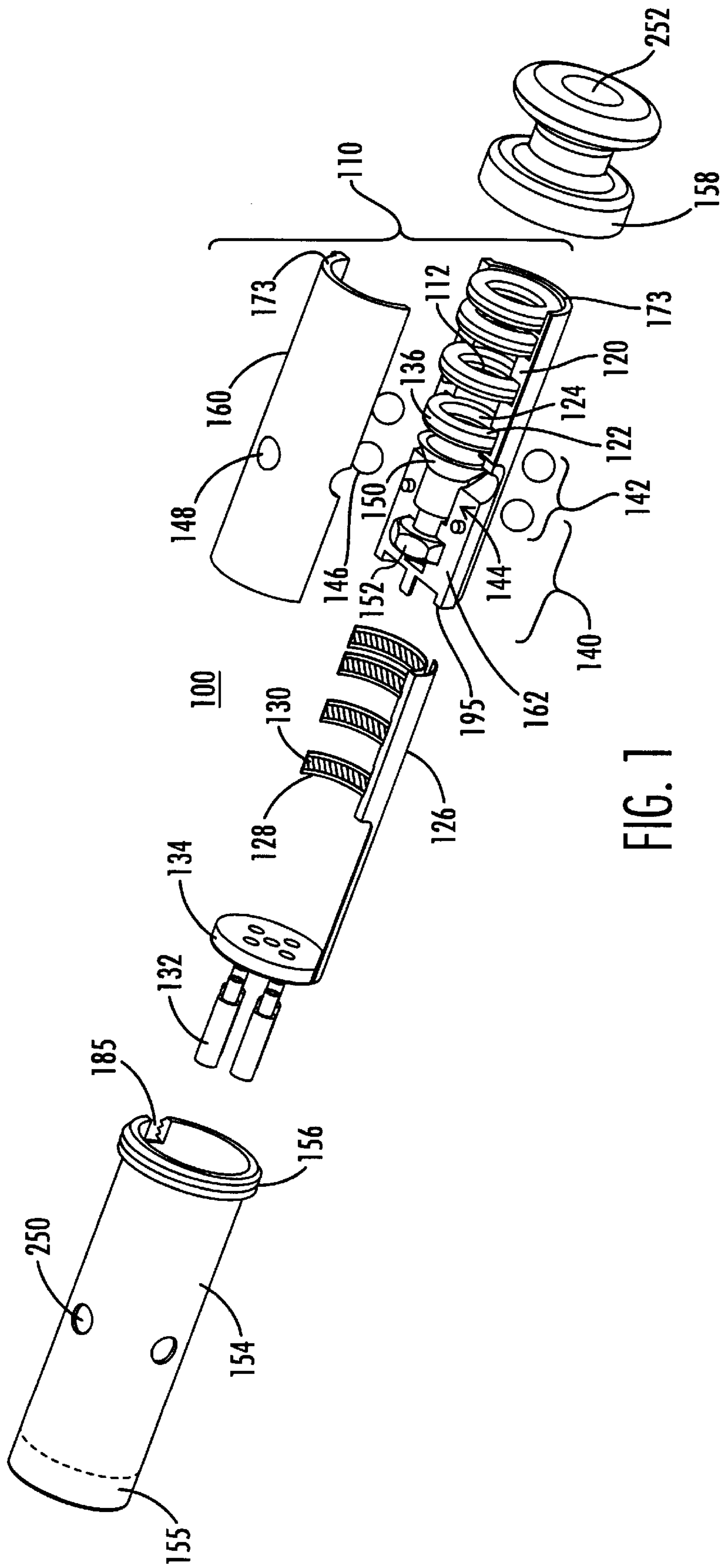
FIG. 1 is an exploded view of the jack socket according to the invention.
Figure 3:
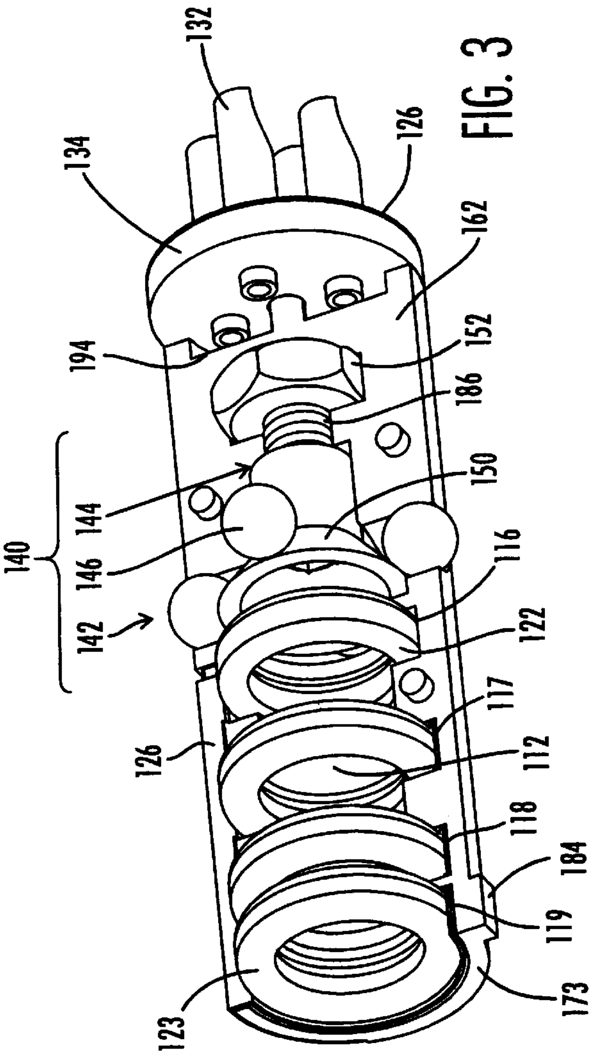
FIG. 3 shows the jack socket according to the invention with the upper body molding removed.
Figure 2:
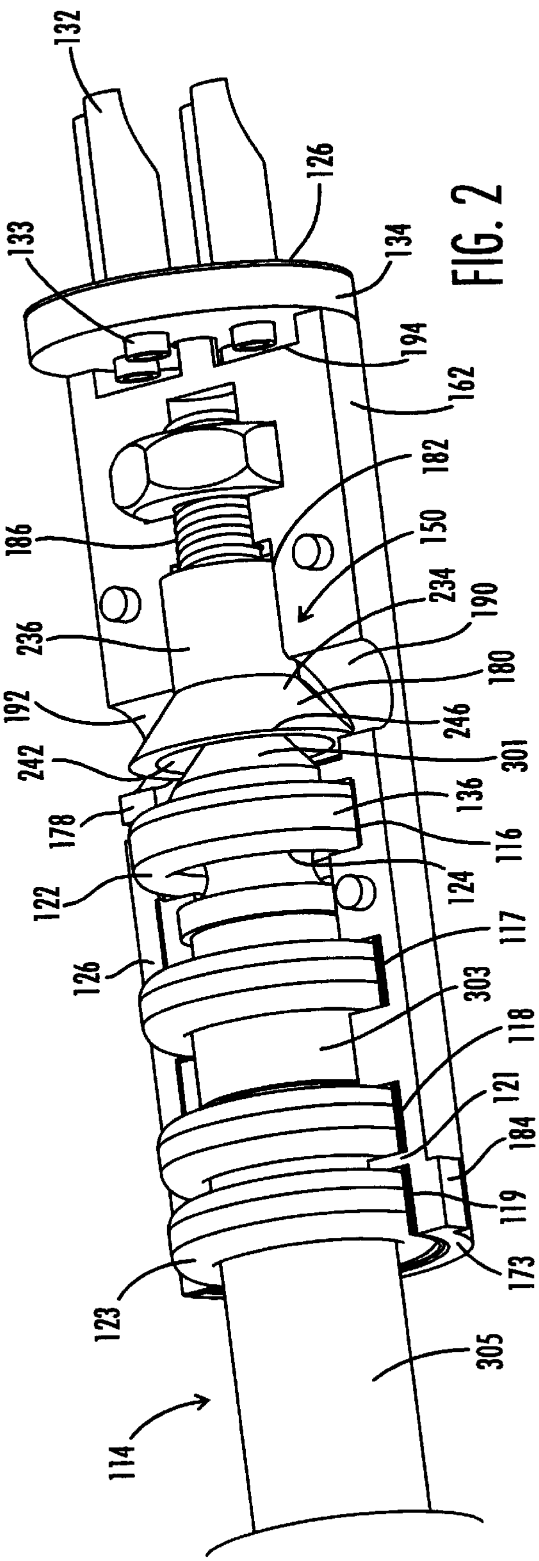
FIG. 2 shows the jack socket according to the invention with the upper body molding removed and a jack plug inserted.

Various views of the jack socket 100 according to the invention are shown in FIGS. 1–3. These figures show the body 110 in which is formed the substantially cylindrical axial bore 112 dimensioned to receive the jack plug 114. Annular grooves, such as the annular grooves 116 and 118, are formed in the body in locations spaced along the length of, and coaxial with, the axial bore. The locations on the axial bore correspond to the positions of at least the tip and sleeve of a standard jack plug. Each annular groove is concentric with, and is perpendicular to, the axial bore. The body is also formed to include the radial passage 120 (shown in FIGS. 4A and 4B) which provides access to the annular grooves from outside the body.

Figure 5A:
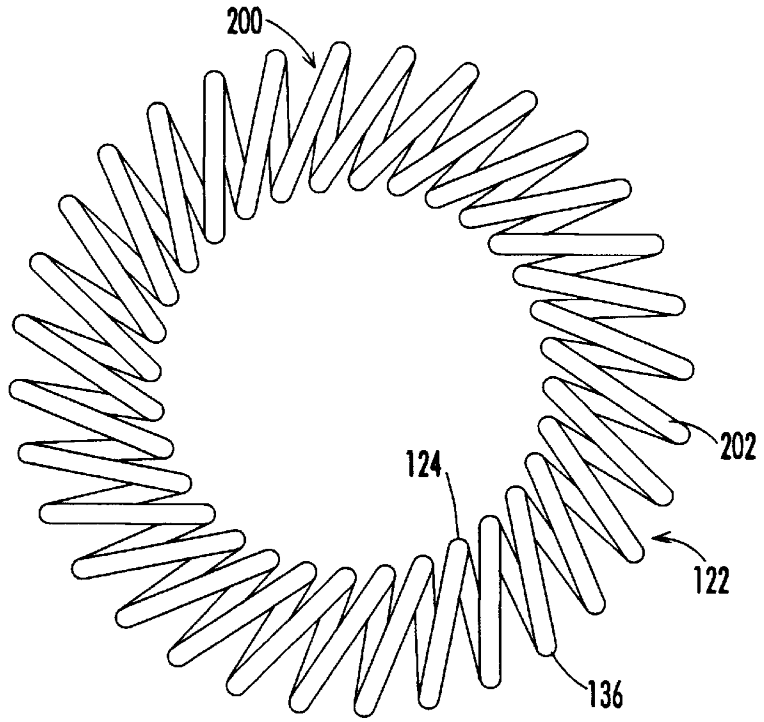
FIG. 5A is a front view of the coil spring of the jack socket according to the invention.

Referring additionally to FIG. 5A, toroidal, canted coil springs, such as the coil spring 122, are each housed in one of the annular grooves. The radially-inwards facing circumference of each coil spring, such as the radially-inwards facing circumference 124 of the coil spring 122, projects radially inwards into the axial bore to contact the jack plug 114 when the latter is inserted into the axial bore 112.

Figure 6A:
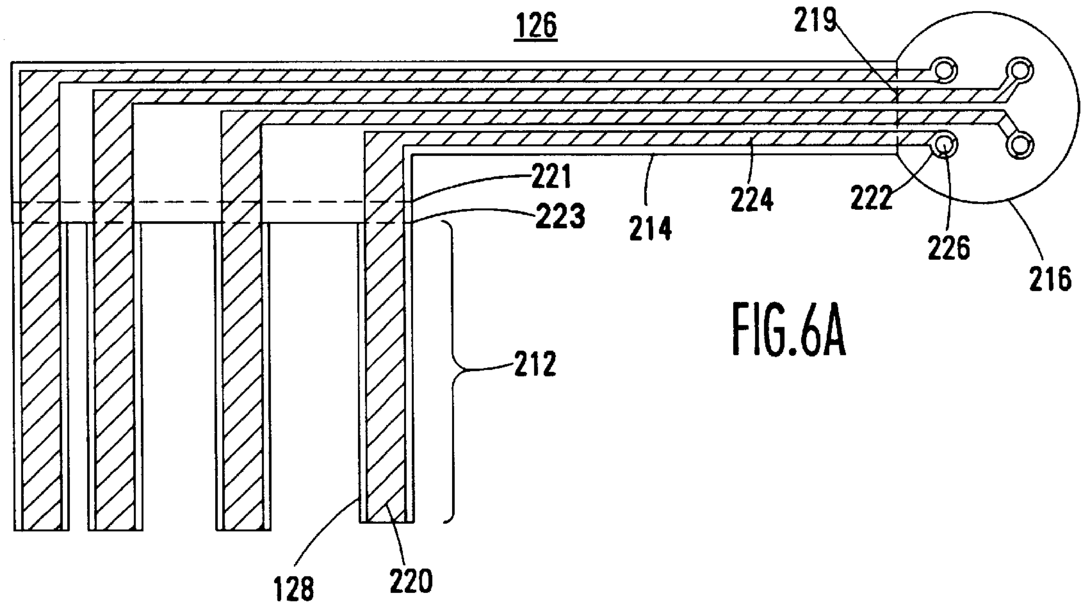
FIG. 6A is a plan view of the printed circuit flex-board of the jack socket according to the invention.
Figure 6D:
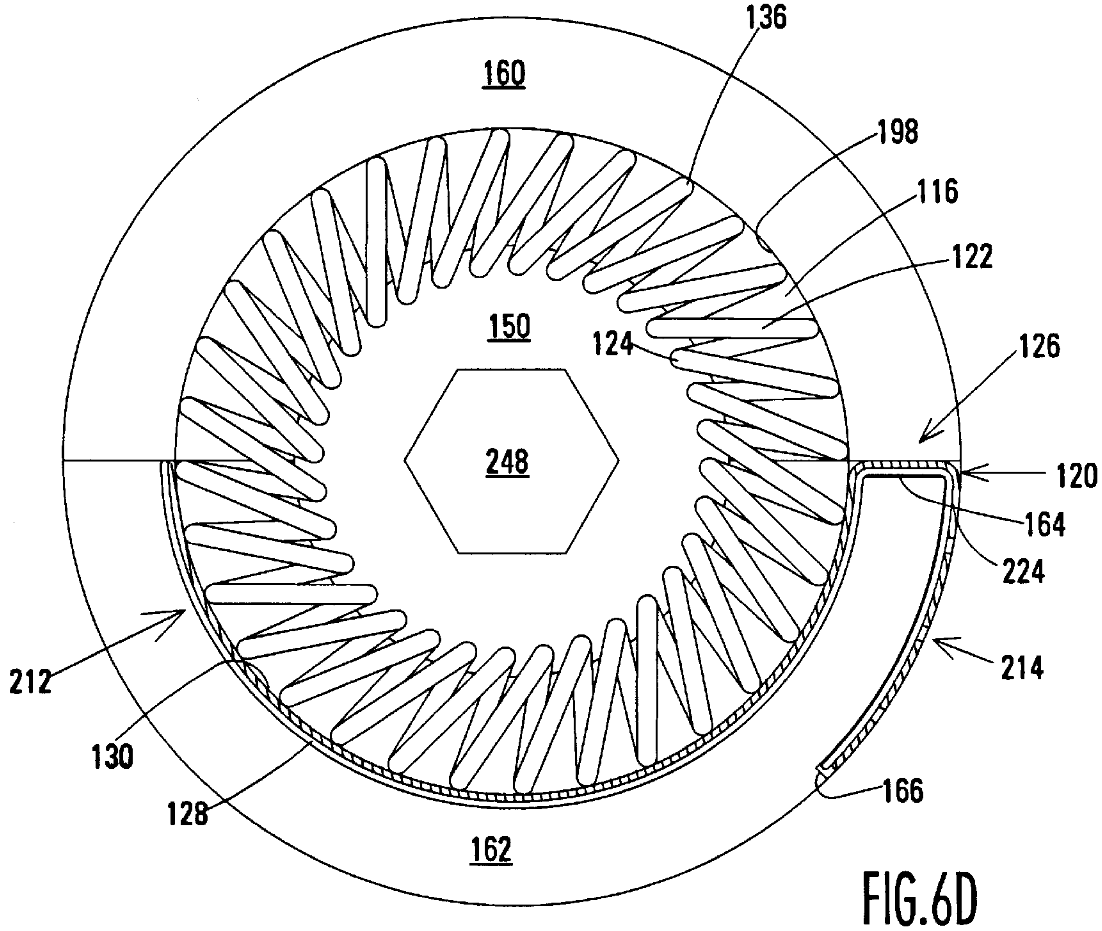
FIG. 6D is a cross sectional view of the rear annular groove of the jack socket according to the invention showing the relative locations of the spring and the printed circuit flex-board. The front of the conical wedge is also shown.

Now referring additionally to FIGS. 6A and 6D, the printed circuit flex-board 126, which extends through the access port 120, branches into multiple connection fingers, such as the connection finger 128. Each of the connection fingers extends into one of the annular grooves between the coil spring and the curved wall 198 of the annular groove. The copper strip on each connection finger faces the respective coil spring and physically and electrically contacts about half of the radially outwards-facing circumference of the coil spring. For example, the copper strip 130 on the connection finger 128 physically and electrically contacts about half of the radially outwards-facing circumference 136 of the coil spring 122. After passing through the access port 120, the flex board runs 126 along the outside of the body 110, and provides an electrical connection from each of the terminals, such as the terminal 132, to one of the coil springs mounted in the annular grooves. The terminals are mounted on the rigidizer 134, which in turn, is mounted on the rear face 195 of the body.

Inserting the jack plug 114 into the jack socket 100 subjects the coil springs to a radial stress which increases the cant angle of the coils of the coil spring and forces each coil into contact with the jack plug to establish a multiple-point circumferential contact with the jack plug. For example, the radial stress forces the radially-inwards facing circumference 124 of the coil spring 122 into contact with the jack plug at multiple contact points on their respective circumferences. Thus, the coil springs provide a multi-point electrical connection between the printed circuit flex board and the entire circumference of the jack plug.

As well as providing a multiple-point circumferential electrical contact between the connection fingers and the jack plug, the coil springs subject the jack plug to a circumferentially-uniform compressive force. This ensures that the electrical contact between the connection fingers and the jack plug is maintained over at least part of the circumference of the jack plug when the jack plug moves in the jack socket due to static loads, such as the weight of the cable attached to the jack plug, and due to dynamic loads, such as those imposed by movement of the performer.

Finally, the substantially circular cross section of the coils of the coil springs enables the jack plug 114 to gently displace the radially-inwards facing circumference of the coil springs when it is inserted into the jack socket 100. This, together with the circumferentially-uniform constraint that the annular grooves impose on axial movement of the coil springs, reduces the susceptibility of the coil springs to damage when the jack plug is inserted into and removed from the jack socket. This structure greatly prolongs the life of the jack socket according to the invention compared with conventional jack sockets.

In the example shown in FIGS. 1–3, the four annular grooves 116–119 are formed in the body 110 at four different points along the axial bore 112 to provide four contacts to the jack plug 114. This enables the jack socket 100 to provide connections for two signal channels and ground, and also enables the jack socket to activate a preamplifier when the jack plug 114 is plugged in. However, the invention is not limited to a jack socket providing four contacts. Omitting one or more of the annular coil springs and connection fingers, and possibly omitting their corresponding annular grooves in the body simplifies the construction of the jack socket while providing connections for fewer signal channels and/or foregoing the ability to activate a preamplifier by plugging in the jack plug. Alternatively, additional annular grooves can be formed in the body, and corresponding additional annular coil springs and connection fingers can be included in these additional annular grooves to provide signal connections for more signal channels. This would require the use of a jack plug with more than one ring connection, and the length of each ring connection, and possibly the sleeve connection, would have to be reduced to accommodate additional ring connections. Such jack plugs are not standardized at present.

In addition to providing a more uniform and more reliable contact with the jack plug, the jack socket 100 according to the invention can optionally additionally include the front-operable engaging mechanism 140, which makes it easier to install than a conventional jack socket. Moreover, a conventional jack socket can be modified to include the front-operable engaging mechanism, which would make such a jack socket also easier to install.

The front-operable engaging mechanism 140 enables the jack socket 100 to be installed in a mounting hole without the need for more access to the back of the mounting hole than is provided by the mounting hole itself. This eliminates the need, for example, to de-string an acoustic guitar when installing the jack socket 100. The front-operable engaging mechanism includes the mounting hole engaging element 142 and the radial expanding element 144. In the embodiment shown in FIGS. 1–3, steel balls mounted in radial bores extending radially inwards from the curved outside surface of the body are used as the mounting hole engaging element, and the conical wedge 150 mounted in the body and engaging with the captive nut 152 is used as the radial expanding element. Rotating the conical wedge using a suitable instrument inserted into the axial bore 112 from the front of the jack socket causes the conical wedge to move axially, and its conical surface to force the steel balls outwards through the radial bores to grippingly engage the wall of the mounting hole. The gripping engagement between the steel balls and the wall of the mounting hole holds the jack socket firmly in place in the mounting hole. Since the front-operable engaging mechanism can be operated entirely from the front of the jack socket after the jack socket has been inserted into the mounting hole, installation of the jack socket according to the invention is greatly simplified.

The body 110 of the jack socket 100 is housed in the sleeve 154. The sleeve holds the components of the jack socket together, electrically shields the jack socket, and prevents the steel balls from escaping from their respective radial bores before the jack socket is installed in the mounting hole. The body is retained in the sleeve by the threaded strap peg 158, in which is formed the axial passage 252 through which the jack plug can enter the axial passage 112 in the body. In versions of the jack socket that are not adapted for installation in lieu of the strap peg of an acoustic guitar, a bored, threaded bushing is substituted for the threaded strap peg.

The elements of the jack socket 100 will now be described in greater detail. The body 110 will be described first referring to FIGS. 4A–4D, and to FIG. 2. The body is composed of the upper body molding 160 and the lower body molding 162. The upper and lower body moldings, collectively "the body moldings," are substantially identical moldings of a suitable plastic. In the preferred embodiment, the body moldings were molded from glass-filled nylon. The lower body molding differs from the upper body molding in that the former has the radial recess 164 and the longitudinal recess 166 formed therein. When the body moldings are mated to form the body 110, the radial recess provides the access port 120 shown in FIG. 4A, and the longitudinal recess houses the part of the printed-circuit flex board that passes along the outside of the body, as shown in FIG. 6E.

Since accurate registration between the body moldings is required when they are mated, the lower body molding 162 includes the cylindrical pegs 168, and the upper body molding 160 is formed to include the cylindrical holes 170 into which the cylindrical pegs engage to define the relative positions the upper body molding and the lower body molding. The cylindrical pegs are inserted into the cylindrical holes when the upper body molding is joined to the lower body molding to form the body 110 during assembly of the jack socket. Inserting the body 110 into the sleeve 154 and tightening down the threaded strap peg 158 maintains the body moldings in the spatial relationship defined by the cylindrical pegs and the cylindrical holes.

The upper and lower body moldings 160 and 162 are each substantially semi-cylindrical. In an embodiment designed for fitting into a half-inch (12.5 mm) mounting hole, the outside diameter of the body moldings was 0.46" (11.7 mm), with a length of about 1.6" (40 mm). The body moldings are each shaped such that, when they are mated to form the body 110, they define the axial bore 112, which extends along almost the entire length of the body. The diameter of the part 172 of the axial bore extending rearwards from the front face 173 of the body for the length of the jack plug 114 between the tip 301 and the sleeve 305 (FIG. 2) is such that this part of the axial bore will snugly accommodate the jack plug. The diameter of the axial bore beyond the length of the jack plug varies, as will be described in detail below.

The body moldings are also shaped, so that, when mated to form the body 110, they define at least two annular grooves, such as the annular grooves 116 and 117, in the part 172 of the axial bore extending rearwards from the front face 173 of the body. Each of the annular grooves has a rectangular cross section and is dimensioned to hold snugly one of the canted toroidal coil springs. For example, the annular groove 116 holds the coil spring 122. In the preferred embodiment, the annular grooves were 0.10" (2.5 mm) wide and 0.059" (1.47 mm) deep. The depth of the grooves is such that the radially-inwards facing circumference (e.g., 124 shown in FIG. 5A) of the coil springs projects into the bore by such a depth that the coil spring engages the jack plug when the latter is inserted into the axial bore 112.

The example shown in the figures has the four annular grooves 116–119. Of these, the annular grooves 116 and 117 are located on the axial bore so that they respectively contact the tip 301 and the ring 303 of the jack plug 114, and the annular grooves 118 and 119 are located on the axial bore so that both contact the sleeve 305 of the jack plug 114.

The body moldings are formed so that the front annular groove 119 lacks a front wall adjacent the front face 173 of the body 110. After the body 110 has been assembled, the threaded strap peg 158 engaged with the sleeve 154 serves as the front boundary of the front annular groove instead of part of the body. The annular groove 118 is located on the axial bore relative to the front annular groove 119 so that the septum 121 between these annular grooves is as narrow as possible. The annular grooves 116 and 117 are located on the axial bore relative to the annular groove 118 such that the coil springs mounted in these grooves respectively contact the tip 301 and the ring 303 of the jack plug when the coil spring mounted in the annular groove 118 contacts the part of the sleeve 305 immediately adjacent the ring. These structural features reduce the distance between the front face 173 of the body and the plane of the centers of the steel balls (e.g., 146) that engage the mounting hole in which the jack plug is mounted. This, in turn, reduces the minimum depth requirement of the mounting hole, which increases the number of applications in which the jack socket 100 can be used.

The body moldings are also shaped so that, when mated to form the body 110, they define the wedge cavity 174 in a position immediately behind the rear-most annular groove 122, and define the nut cavity 176 behind the wedge cavity. From front to rear, the wedge cavity includes the front wedge bearing 178, the substantially frusto-conical portion 180, and rear wedge bearing 182. The wedge cavity houses the conical wedge 150 in a manner that allows the conical wedge to rotate and to move axially. The front and rear wedge bearings respectively support the frustoconical portion 234 and the cylindrical portion 236 of the conical wedge in the body, and help the conical wedge to withstand asymmetrical radial loads.

The nut cavity 176 has a hexagonal cross section in a plane perpendicular to the axial bore 112 and houses the captive nut 152. The hexagonal cross section matches the hexagonal profile of the captive nut and prevents the captive nut from rotating. The axial bore 112 extends rearwards of the wedge cavity to connect the wedge cavity to the nut cavity, and extends rearwards of the nut cavity to accommodate the threaded extension 186 of the conical wedge.

The upper body molding 160 and the lower body molding 162 respectively have the radial bores 148 and 188 formed therein, and are also shaped so that, when mated to form the body 110, they define the radial bores 190 and 192. The radial bores 148, 188, 190, and 192 each accommodate a steel ball. For example, the radial bore 148 accommodates the steel ball 146.

The body moldings are also shaped so that, when mated to form the body 110, they define the rear recess 194, and form the rigidizer mounting peg 196. As shown in FIG. 2, the rear recess accommodates the part of the terminals, such as the part 133 of the terminal 132, that projects from the front-facing part of the rigidizer 134. The rigidizer mounting peg defines the lateral location of the rigidizer on the rear face 195 of the body 110.

Finally, the body moldings are shaped so that, when mated to form the body 110, they form the sleeve lug 184.

The sleeve lug engages with the slot 185 in the sleeve 154, as shown in FIG. 1. This defines the rotational position of the body relative to the sleeve, which helps ensure that the sleeve holes in the sleeve line up with the radial bores in the body. For example, the sleeve lug and slot ensure that the sleeve hole 250 in the sleeve lines up with the radial bore 148 in the body.

Referring now to FIG. 6D, each of the annular grooves accommodates a canted toroidal coil spring, and additionally accommodates a connection finger interposed between the curved wall of the annular groove and the coil spring. For example, the annular groove 116 accommodates the coil spring 122 and additionally accommodates the connection finger 128 interposed between the curved wall 198 and the coil spring. One half of the radially-outwards facing circumference 136 of the coil spring 122 contacts the curved wall 198 of the annular groove and the other half of the radially-outwards facing circumference of the coil spring contacts the connection finger mounted in the annular groove. The radially-inwards facing circumference 124 of the coil spring 122 contacts the jack plug.

Figure 5B:
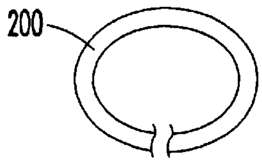
FIG. 5B is a side view of one half of one coil of the coil spring of the jack socket according to the invention.

The coil spring 122 will now be described additionally referring to FIGS. 5A–5C. The other coil springs are identical. The coil spring 122 has about 32 coils, such as the coil 200, formed from a piece of 0.011" (260 $\mu$m) diameter steel wire 202, the ends of which are joined together to give the coil spring its toroidal shape, as shown in FIG. 5A. The coils of the coil springs have an outside diameter of about 0.098" (2.49 mm), and are canted at an average of about 27 degrees relative to the radius, so that, while their overall width is about 0.098", their overall height is about 0.083" (2.11 mm). The difference between the width and the height of the coil 200 is shown in FIG. 5B.

The coil spring 122 has an inside diameter of about 0.210" (5.33 mm), an outside diameter of 0.376" (9.55 mm), and extends from the annular groove 116 (FIG. 2) into the axial bore 112 by about 0.024" (0.6 mm). The inside diameter of the coil spring must increase to 0.25" (6.25 mm) when the jack plug is inserted. The outside diameter of the coil spring is bounded by the curved wall 198 of the annular groove, so the cant angle of the coils increases until the overall height of the coils is reduced to about 0.063" (1.6 mm) to expand the inside diameter of the coil, as illustrated in FIG. 5C.

Figure 5C:
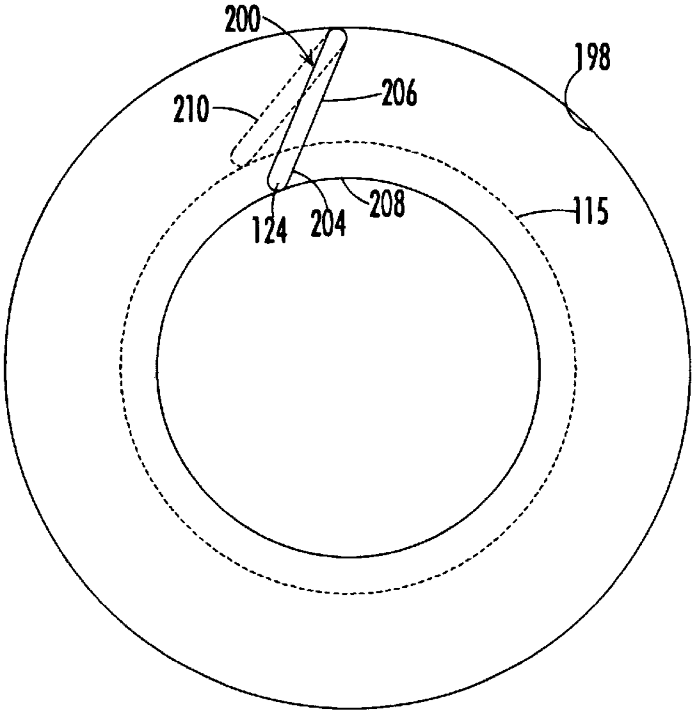
FIG. 5C is a front view of one half of one coil of the coil spring of the jack socket according to the invention showing how the cant of the coil increases when the jack plug is inserted into the jack socket.

In FIG. 5C, which shows only one half 204 of the coil 200 of the coil spring 122 for simplicity, the position of the half coil without the jack plug inserted is indicated by the solid line 206. The radially-inwards facing circumference 124 of the entire coil spring 122 is indicated by the line 208. The circumference of the jack plug is indicated by the line 115, and the position of the half coil 204 when its cant angle increases in response to the jack plug being inserted is indicated by the dotted line 210. The outside diameter of the half coil is bounded by the curved wall 198 of the annular groove as noted above. The connection finger has been omitted from FIG. 5C to simplify the drawing.

By canting the coils of the coil spring 122, each coil can deform by torsion along its length to enable the inside diameter of the coil spring to expand to accommodate the jack plug. If the coils of the coil spring were radially disposed, the inside diameter of the coil spring would have to expand by each coil bending at two points. This requires a considerably greater radial force than the force required to torsionally deform the coils to increase the cant angle. The reduced force required to deform a canted coil by torsion compared with the force required to deform a radially-disposed coil enables a larger-diameter coil wire to be used for a given radial force exerted on the jack plug. The larger-diameter coil wire makes the coil spring less vulnerable to damage, and reduces the electrical resistance of the paths between the connection finger 128 and the jack plug.

The coil springs in a practical embodiment were supplied by the Bal Seal Engineering Company, Inc. of Santa Ana, Calif. To simplify most of the drawings, the coil springs are depicted schematically as toroids.

Since the canted toroidal coil springs, such as the coil spring 122, are made of steel wire having a relatively small diameter, the resistance between any point on the coil spring and a point diametrically-opposite that point can be greater than is desirable in a signal connector. The jack plug according to the invention uses the printed circuit flex-board 126 to overcome this problem. Each of the connection fingers of the printed circuit flex-board makes contact with about one half of the radially-outwards facing circumference of the respective coil spring. For example, as shown in FIG. 6D, the copper strip 130 on the connection finger 128 makes contact with one half of the radially-outwards facing circumference 136 of the coil spring 122. In this manner, the coil spring provides electrical conduction between the copper strip on the connection finger and the jack plug 114 via multiple parallel paths each having the resistance of the length of the coil wire in one half of one coil (e.g., half of the coil 200). The number of parallel paths is equal to the number of coils in the coil spring 122.

The structure of the printed circuit flex-board 126 and the manner in which it interconnects the coil springs to the respective terminals mounted on the rigidizer on the rear face of the body will now be described with reference to FIGS. 1, and 6A–6E.

FIG. 6A shows the printed circuit flex-board 126, which has a 0.006" (150 $\mu$m) thick flexible substrate covered with a 2 oz/ft$^2$ (0.6 kg/m$^2$) copper cladding. Referring to this figure and to FIG. 6D, the copper is etched to the pattern shown by the shaded area in FIG. 6A, and the substrate is cut to the profile shown. The printed circuit flex-board includes the connection finger portion 212, the connecting portion 214, and the eyelet portion 216. The connection finger portion includes connection fingers normally equal in number to the number of connections to be made to the jack plug. In the example shown, four connections are made to the jack, and the connecting finger portion includes four connection fingers. Each of the connection fingers is profiled to fit in one of the annular grooves in the lower body molding 162. For example, the connection finger 128 is profiled to fit in the annular groove 116. The connection finger 128 is covered by the copper strip 130 over the majority of its width and along its length. The copper strip is gold plated. The copper strip is connected to the eyelet 222 in the eyelet portion 216 by the track 224, which runs lengthwise along the connecting portion 214 and then across the eyelet portion to the eyelet. The hole 226 is formed in the center of the eyelet. The other connection fingers are similar to the connection finger 128, and the copper strip on each finger portion is connected to a respective eyelet by a track as just described.

Figure 4A:
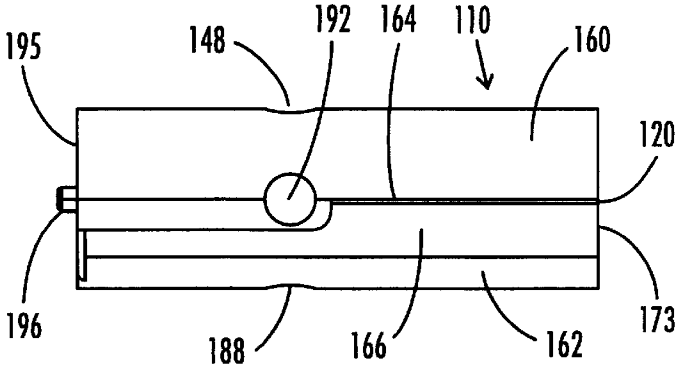
FIGS. 4A and 4B are respectively a side view and a front view of the body of the jack socket according to the invention.
Figure 4B:
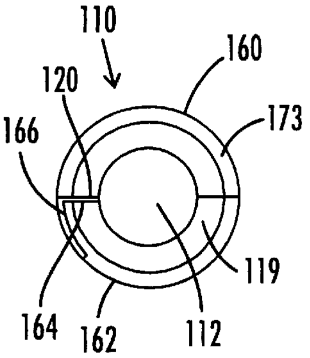
Figure 4C:
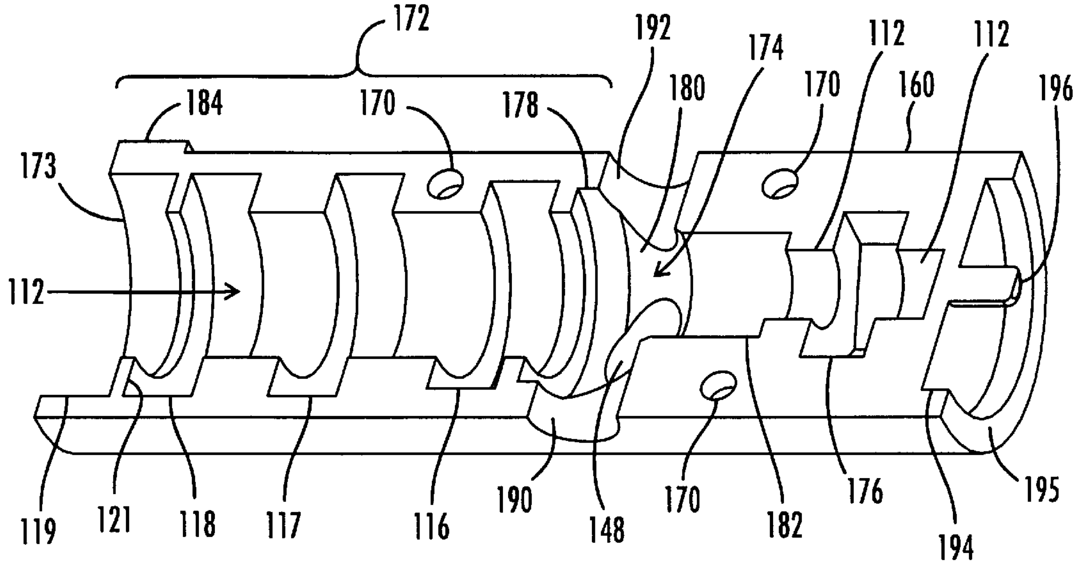
FIGS. 4C and 4D respectively show the upper body molding and the lower body molding of the jack socket according to the invention.
Figure 4D:
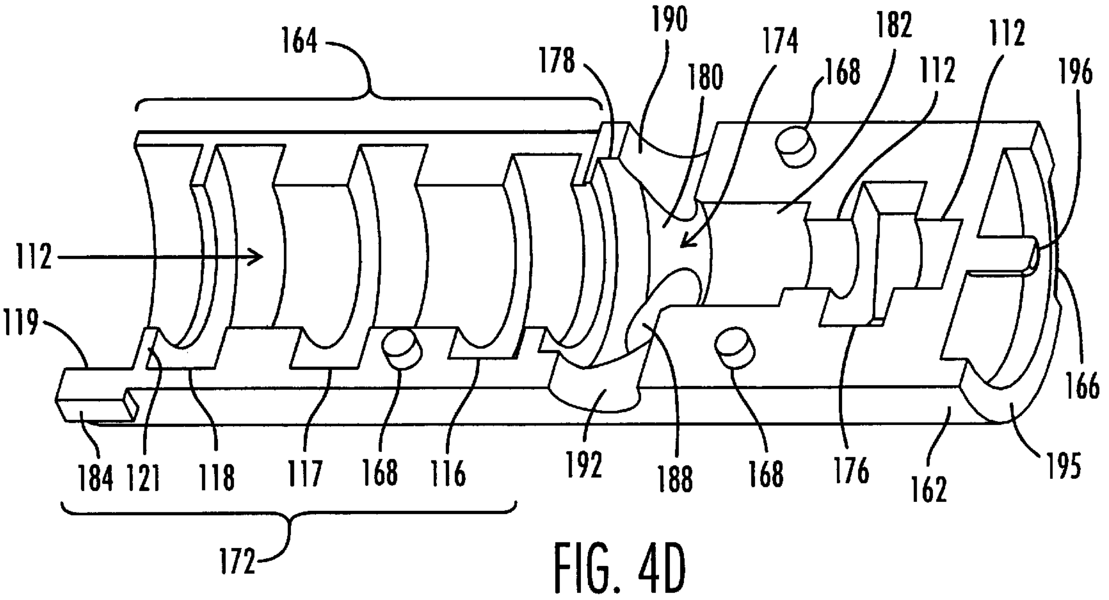
Figure 6B:
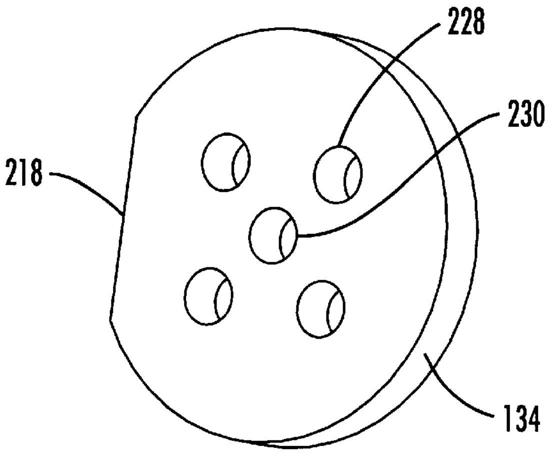
FIG. 6B shows the rigidizer of the jack socket according to the invention.

Referring now to FIGS. 4A, 4B and 6B, the rigidizer 134 is a piece of 0.062" (1.6 mm) thick G10 fiber glass board cut to the substantially circular profile shown. The profile and extent of the rigidizer matches the shape of the rear face 195 of the body 110. The flat 218 substantially matches the rear portion of the longitudinal recess 166 formed in the lower body molding 162 and facilitates clean bending of the printed circuit flex-board 126 at the point indicated by the broken line 219 in FIG. 6A. A number of holes are formed in the rigidizer as shown. The center hole 230 is dimensioned to receive the rigidizer mounting peg 196 formed in the rear of the body. The remaining holes each correspond to the holes in the eyelets of the printed circuit flex board 126 and are dimensioned to receive the part of the terminals. For example, the hole 228 corresponds to the hole 226 in the eyelet 222 and is dimensioned to receive part of the terminal 132. Four terminal-mounting holes are shown in the example shown in FIG. 6B.

The printed circuit flex-board 126 is attached to the rigidizer 134 by placing the eyelet portion 216 over the rigidizer so that the holes in the eyelets line up with the corresponding four holes in the rigidizer, and the connection portion 214 passes over the flat 218. A terminal is then inserted through each hole in the printed circuit flex-board into the corresponding hole in the rigidizer and is then expanded on the side of the rigidizer remote from the flex-board to secure the terminal in place in the rigidizer. For example, the terminal 132 is inserted through the hole 226 in the eyelet 222 and through the hole 228 in the rigidizer and is expanded on the side of the rigidizer remote from the printed circuit flex-board, as shown in FIG. 2. Physical contact between the terminal and the eyelet provides a low-impedance electrical contact between the terminal and the eyelet, and, ultimately, the copper strip on the connection finger mounted in the annular groove.

The terminal 132 is typically a solder-type terminal, i.e., wires are attached to it by soldering, but terminals of other types, for example, screw-type terminals, could be used.

Figure 6C:
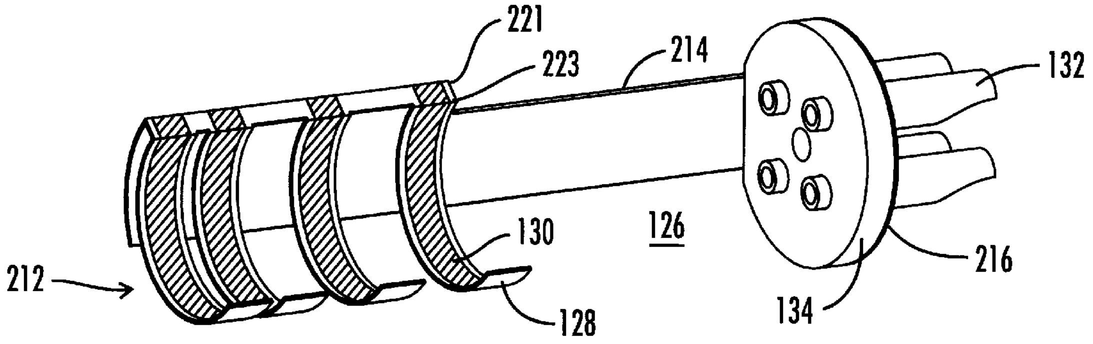
FIG. 6C shows the printed circuit flex-board of the jack socket according to the invention after the printed circuit flex-board has been attached to the rigidizer and folded.
Figure 6E:
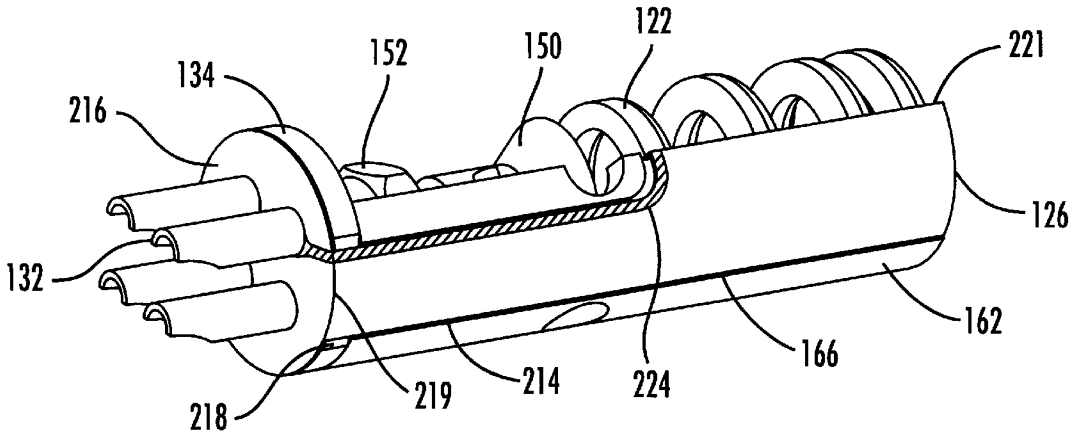
FIG. 6E shows the rear and side of the jack socket according to the invention with the upper body molding removed and shows the printed circuit flex-board running in the longitudinal recess in the lower body molding towards the rigidizer.

After the rigidizer 134 has been attached to the printed circuit flex-board 126, the latter is bent along the three broken lines shown in FIG. 6A. The shape of the printed circuit flex-board/rigidizer assembly after bending is shown in FIG. 6C. It can be seen that the printed circuit flex-board is subject to a 90° bend along each of the broken lines 221 and 223 between the connection finger portion 212 and the connecting portion 214, and to a third 90° bend along the broken line 219 between the connecting portion and the eyelet portion 216.

Installation of the printed circuit flex-board 126 and the rigidizer 134 in the lower body molding 162 is shown in FIGS. 6D and 6E. The rigidizer is engaged with the rigidizer mounting peg 196, which mounts the rigidizer on the rear face 195 of the body. The connection fingers are then laid into the annular grooves in the lower body molding 162. For example, the connection finger 128 is laid into the annular groove 116 with the copper strip 130 facing towards the axial bore 112. This lays part of the connecting portion 214 of the printed circuit flex-board 126 in the radial passage 120 formed by the upper body molding 160 and the radial recess 164 in the lower body molding, and lays the rest of the connecting portion in the longitudinal recess 166 in the lower body molding. FIG. 6D shows the disposition of the connection finger 128 of the printed circuit flex-board between the radially-outwards facing circumference 136 of the coil spring 122 and the curved wall 198 of the annular groove 116. FIG. 6D also shows the disposition of the connecting portion 214 through the radial passage 120 and in the longitudinal recess 166. In FIG. 6D, the copper cladding on the printed circuit flex board is shaded, and its thickness has been exaggerated to show it more clearly. FIG. 6E shows the disposition of the connecting portion of the printed circuit flex-board in the longitudinal recess along the side of the lower body molding, and disposition of the eyelet portion 216 of the printed circuit flex-board on the rigidizer 134. Tracks other than the track 224 are not shown on the connecting portion in FIG. 6E to simplify the drawing.

The arrangement of the printed circuit flex board shown in FIGS. 6A–6E is that of the preferred embodiment. A number of variations are possible. A different number of connection fingers, copper strips, tracks, eyelets and terminals could be used to make a jack socket providing a different number of connections to the jack plug. The impedance between the terminal 132 and the jack plug could be halved by using an additional printed circuit flex-board similar to the printed circuit flex-board 126. The additional printed circuit flex-board would connect the part of each coil spring in the upper body molding 160 to its respective terminal mounted on the rigidizer 134. The upper body molding 160 would be formed to define a radial recess and a longitudinal recess similar to the radial recess 164 and the longitudinal recess 166 in the lower body molding 162. The additional printed circuit flex-board would run to the rigidizer 134 through the radial recess and in the longitudinal recess in the upper body molding. The rigidizer would be formed with an additional flat similar to the flat 218, and diametrically opposite thereto, to facilitate bending the additional printed circuit flex-board. The eyelets of additional printed circuit flex-board would overlay the eyelets of the printed circuit flex-board 126, and the terminals, such as the terminal 132, would be inserted through both sets of eyelets and would be expanded on the front-facing side of the rigidizer as before.

A high-current connector providing two connections to the jack plug could be made by substituting a copper foil for each of the printed circuit flex-boards in the variation just described. The copper foil would be arranged to completely encircle the coil spring in the annular groove. It is preferable that the copper foil completely encircle the coil spring via two parallel paths. This can be done by, for example, the copper foil extending around the coil spring slightly more than once (i.e., by more than 360°) or by the copper foil branching into two paths at the radial recess so that one path occupies the part of the annular groove in the upper body molding 160 and the other path occupies the part of the annular groove in the lower body molding 162.

A further variation would reduce the impedance of the contact with the jack plug by forming the coil springs, such as the coil spring 122, from a composite wire. The wire would have a core of a material having good elastic properties, such as steel, and a cladding of a material having good conductivity, such as copper. The wire would therefore have a combination of the good properties of both materials.

Figure 7A:
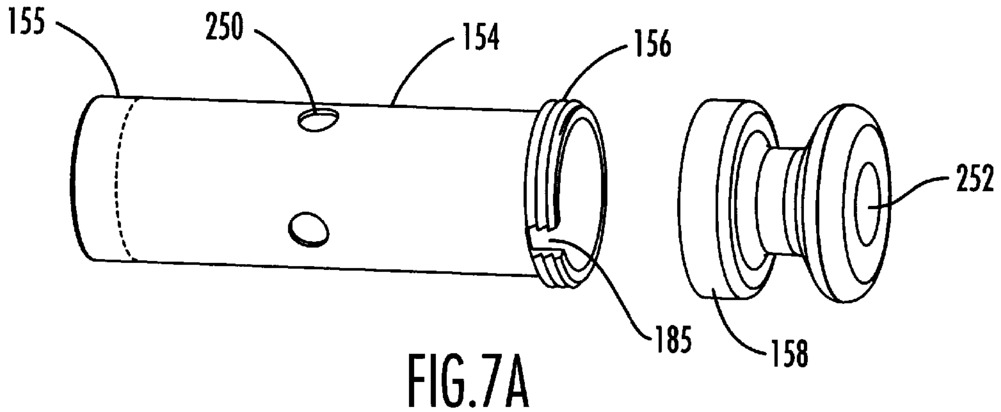
FIG. 7A shows the sleeve and the threaded strap peg of the jack socket according to the invention.
Figure 7B:
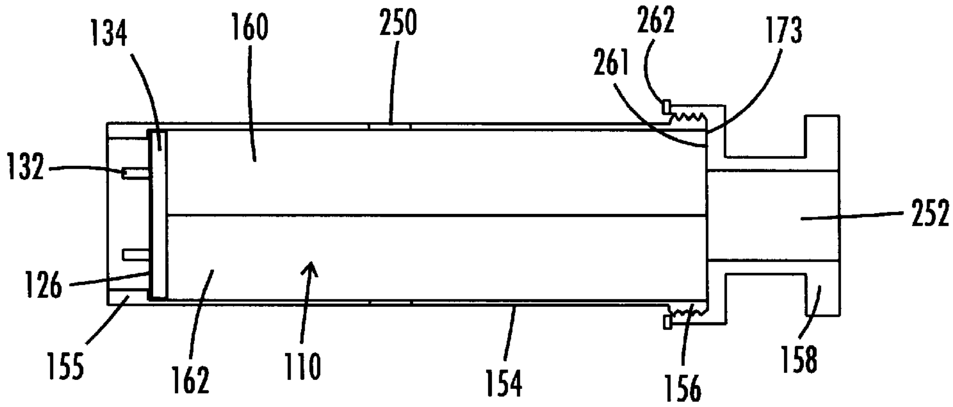
FIG. 7B is a cross sectional view of the sleeve and the threaded strap peg of the jack socket according to the invention showing how the body is installed in the sleeve.
Figure 8:
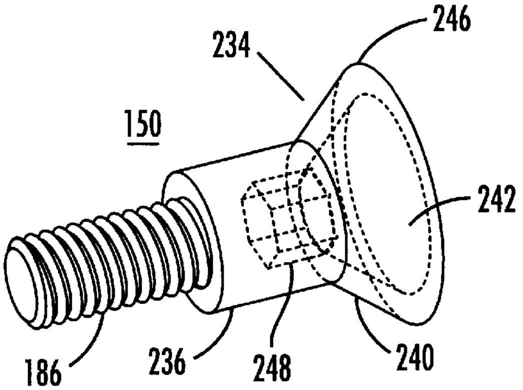
FIG. 8 shows the conical wedge of the jack socket according to the invention.

FIG. 7A shows the sleeve 154, which houses, holds together, and electrically shields the jack socket 100. FIG. 7B shows the body 110 installed in the sleeve. The sleeve 154 is an open cylinder machined or fabricated from brass, and includes the front threaded portion 156 on the outside of the sleeve, adjacent its front end, and the rear flange 155, which projects into the interior of the sleeve adjacent the rear end. The inside diameter of the sleeve is such that the sleeve closely fits the outside diameter of the body 110. The length of the sleeve is such that, when the body 110 is inserted into the sleeve, and the eyelet portion of the printed circuit flex-board 126 backed by the rigidizer 134 abuts the rear flange, the front face 173 of the body is flush with, or slightly proud of, the front rim of the sleeve.

Radial sleeve holes corresponding to the radial bores in the body are formed in the sleeve. For example, the sleeve hole 250 is formed in a location in the sleeve such that, when the body 110 is housed in the sleeve, and the sleeve lug 184 is engaged with the slot 185, it is aligned with, and communicates with, the radial bore 148. The sleeve holes provide access for the steel balls to emerge from their respective radial bores and to grippingly engage the wall of the mounting hole. The sleeve holes are made slightly smaller than the diameter of the steel balls and so also serve to retain the steel balls in their respective radial bores prior to the jack socket being installed in the mounting hole.

The body 110 is retained in the sleeve 154 by the threaded strap peg 158, which is screwed onto the front threaded portion 156. The threaded strap peg includes the internal face 261 that abuts the front face 173 of the body, and drives the body into the sleeve so that the printed circuit flex-board 126 fully contacts the rear flange 155 of the sleeve when the internal face 261 contacts the front of the sleeve. The sleeve lug engaging in the slot 185 in the sleeve prevents the body from being rotated out of alignment when the threaded strap peg is tightened up. The threaded strap peg includes the axial passage 252 through which the jack plug is inserted into the jack plug 100 when the latter is installed in the guitar. A threaded bushing with an axial passage can be substituted for the threaded strap peg in versions of the jack socket 100 that are not intended for installation in lieu of the strap peg of an acoustic guitar. The strap peg could be attached to the sleeve by means other than the threaded portions described above: for example a bayonet connector, an adhesive, or welding or soldering could be used to attach these parts to one another.

The structural elements of the front-operable engaging mechanism, that enables the jack socket 100 according to the invention to be installed in a mounting hole without the need for more access to the rear of the mounting hole than is provided by the mounting hole itself, will now be described with reference to FIGS. 2 and 7. As already noted, the upper and lower body moldings 160 and 162 have formed in them, or collectively define, the plural radial bores 148, 188, 190, and 192. Each of these bores is substantially cylindrical, and interconnects the frusto-conical portion 180 of the wedge cavity 174 formed in the body 110 with the outside wall of the body. A 0.25" (6.25 mm) diameter steel ball, such as the steel ball 146, is inserted into each of the radial bores and is free to slide radially therein. A greater or lesser number of radial bores and steel balls, for example, three or five, could alternatively be used.

The steel balls mounted in radial bores in the body, such as the steel ball 146 mounted in the radial bore 148, are an example of a mounting hole engaging element 142 that is moved radially outwards to grippingly engage the wall of the mounting hole. Steel ball bearings are low in cost, readily available, accurately dimensioned, and are effective at gripping the wall of a typical mounting hole, so are the preferred mounting hole engaging element. Alternative mounting hole engaging elements could be used. For example, cylindrical elements dimensioned to fit in the radial bores could be used, and also could be formed with outer ends specially shaped to grip the walls of certain types of mounting holes more effectively than the spherical surface of a steel ball.

The steel balls are moved radially into gripping engagement with the mounting hole by the radial expanding element 144. In the embodiment shown, the conical wedge 150 and the captive nut 152 mounted in the body operate as the radial expanding element. The conical wedge is shown in detail in FIG. 7 and will now be described with reference to FIGS. 2 and 7. The conical wedge has three main portions, the frusto-conical portion 234, the cylindrical portion 236, and the threaded portion 186. The conical wedge is formed from stainless steel. Other hard but not brittle materials could be used.

The conical outer surface 240 of the frusto-conical portion 234 of the conical wedge 150 forces the steel balls, such as the steel ball 146, outwards in the radial bores, such as the radial bore 148, when the conical wedge is moved towards the rear of the jack socket 100. To perform this function, the frusto-conical portion need only include the conical outer surface 240. However, in the preferred embodiment, the frusto-conical portion is made hollow, and includes the conical inner surface 242, to reduce the distance between the front face 173 of the body and the plane of the centers of the radial bores 148, 188, 190, and 192. Making the frusto-conical portion hollow enables this distance to be reduced because the hollow portion accommodates the tip 301 of the jack plug 114 when the conical wedge is in its forward-most position, as shown in FIG. 2. Reducing the distance between the front face of the body and the plane of the centers of the radial bores provides the advantage of reducing the minimum depth requirement of the mounting hole, which enables the jack socket according to the invention to be used in a greater range of applications, as noted above.

The outer lip 246 of the conical outer surface 240 of the frusto-conical portion 180 of the conical wedge 150 fits closely in the front wedge bearing 178 of the wedge cavity 174 formed in the body, and the cylindrical portion 236 of the conical wedge fits closely in the rear wedge bearing 182. The conical wedge can be subject to a radially asymmetrical load when the jack socket is installed in a mounting hole in wood, or in another material that can have substantially asymmetrical deformation properties. The front and rear wedge bearings support the conical wedge on opposite sides of the contact point between the steel balls and the conical outer surface of the conical wedge. This helps prevent the conical wedge from deforming over time in response to such an asymmetrical load, with a consequent loss of gripping engagement between the steel balls and the mounting hole.

The instrument engaging element 248 is formed in the cylindrical portion 236 of the conical wedge 150, starting at the apex of the conical inner surface 242 so that it is accessible through the frusto-conical portion 234. In the preferred embodiment, the instrument engaging element is formed to engage with a 0.062" (1.57 mm) hex wrench. The instrument engaging element could alternatively be formed to engage with other, similar types of wrench, such as a Torx™ wrench, or could be formed to provide a straight, Phillips, Pozidriv™, or some other suitable form of screwdriver slot. The instrument engaging element enables an instrument, preferably a hexagonal wrench, inserted into the axial bore 112 to rotate the conical wedge.

The threaded portion 186 is threaded to engage with the captive nut 152 mounted in the nut cavity 176 formed in the body 110. Axial movement of the threaded portion is accommodated in the body 110 by the rear-most portions of the axial bore 112.

Installation of the jack plug 100 according to the invention in a mounting hole will be described with reference to FIGS. 9A and 9B, using a mounting hole in an acoustic guitar as an example. It is assumed that the acoustic guitar has previously been fitted with an electrical pick-up, and that a ½" (12.5 mm) diameter mounting hole has been drilled through the bottom block of the guitar at the former location of the strap peg.

A fish tape is inserted into the mounting hole, and is used to engage the electrical wires from the pickup and/or preamplifier, and to draw these wires out of the guitar through the mounting hole. The wires are then attached to the respective terminals, such as the terminal 132, of the jack socket 100. For example, if the terminal 132 is a solder-type terminal, the wires are attached to the terminal 132 by soldering.

Figure 9A:
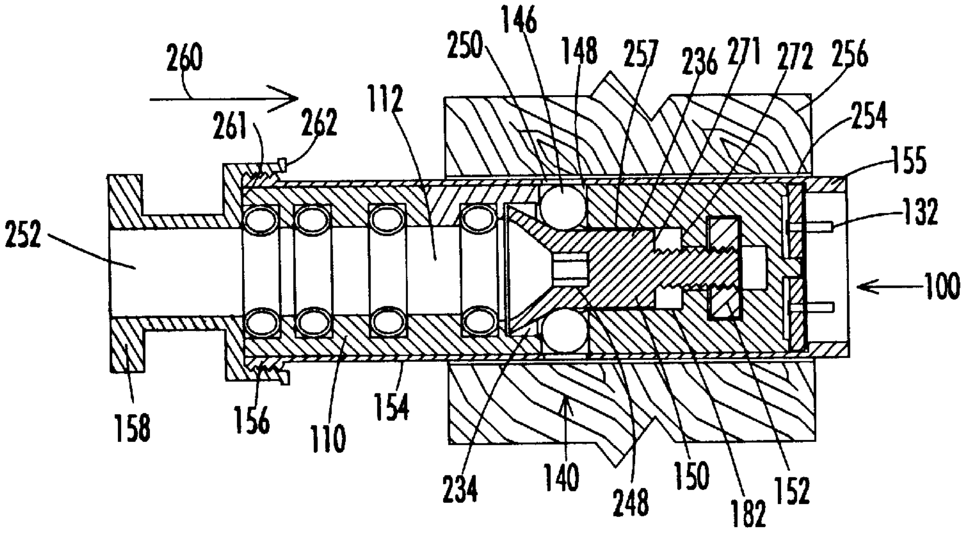
FIGS. 9A and 9B illustrate how the jack socket according to the invention is installed in the mounting hole in a guitar, for example, and illustrate the operation of the front-operable engaging mechanism.

FIG. 9A shows the jack socket 100 in the course of insertion into the mounting hole 254 in, for example, the bottom block 256 of an acoustic guitar. The jack socket is shown in cross section so that the action of the front-operable engaging mechanism 140 can be seen. The wires that would normally be connected to the jack socket at this stage are omitted, and the end block is not distinguished from the end wall of the guitar to simplify the drawing. The jack socket 100 is supplied with the conical wedge 150 in its forward-most position, as shown in FIG. 9A. With the conical wedge in this position, the steel balls, such as the steel ball 146, abut the outer surface 257 of the cylindrical portion 236 of the conical wedge. The diameter of the cylindrical portion is such that the steel balls are completely housed in their respective radial bores. For example, the steel ball 146 is completely housed in the radial bore 148. Thus, when the jack socket is inserted into the closely-fitting mounting hole 254 in the direction indicated by the arrow 260, this process is unimpeded by the steel balls projecting from the sleeve 154 of the jack socket.

Figure 9B:
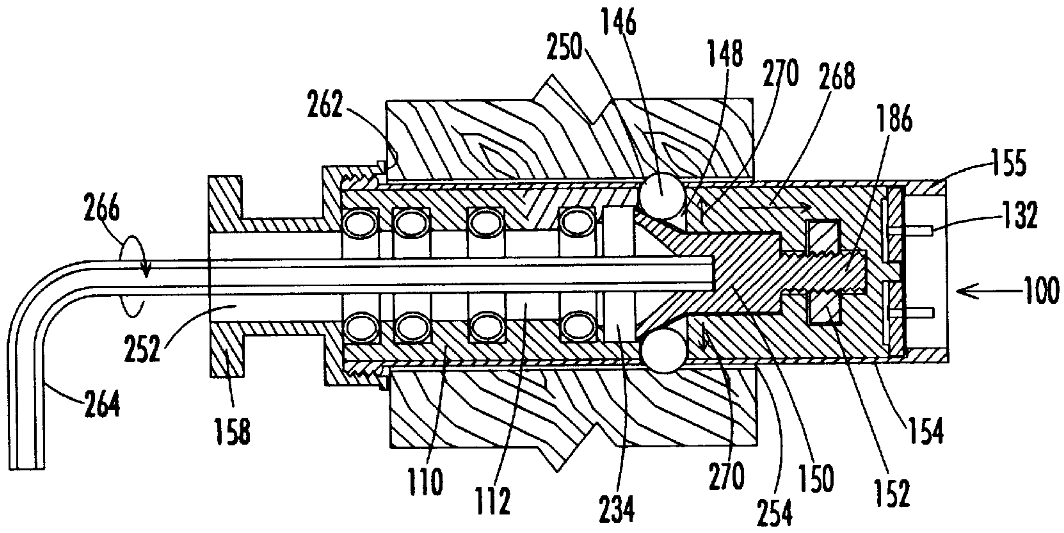

The jack socket is advanced into the mounting hole 254 until the external face 262 of the strap peg 158 abuts the body of the guitar, as shown in FIG. 9B. The hex wrench 262, which is of the appropriate size to engage in the instrument engaging element 248 in the conical wedge 150, is inserted through the axial passage 252 in the strap peg and into the axial bore 112 to engage in the instrument engaging element. When the wrench rotates the conical wedge in the direction indicated by the arrow 266, the threaded portion 186 engaged with the captive nut 152 translates the rotation of the conical wedge into rearwards axial motion of the conical wedge, as indicated by the arrow 268. The rearwards axial motion of the conical wedge forces the steel balls, such as the steel ball 146, radially outwards, as indicated by the arrows 270, into gripping engagement with the wall of the mounting hole 254. This secures the jack socket in place in the mounting hole.

It should be noted that the wedge cavity 174 (FIG. 4C) is shaped such that the rear end 271 of the cylindrical portion 236 of the conical wedge 150 abuts the rear face 272 of the rear wedge bearing 182 before the steel balls abut their respective sleeve holes in the sleeve 154. This prevents the steel balls from distorting the sleeve in the vicinity of the sleeve holes. If the sleeve were distorted in this manner, it could engage the wall of the mounting hole 254, which would make it difficult to remove the jack socket 100 from the mounting hole.

It can be seen from the above description that, in the process of installing the jack socket according to the invention in the mounting hole, it was only necessary to access to the rear of the mounting hole to fish out the wires to be connected to the jack socket, and that this access was made through the mounting hole itself. Accordingly, installation of the jack socket according to the invention is considerably more convenient than installation of a conventional jack socket because there is no need to de-string the guitar to gain access the back of the mounting hole through the sound hole.

Although this disclosure describes illustrative embodiments of the invention in detail, it is to be understood that the invention is not limited to the precise embodiments described, and that various modifications may be practiced within the scope of the invention defined by the appended claims.

I claim:

1. A jack socket for a phone jack, the jack socket comprising:

a body defining:

an axial bore adapted to receive the phone jack, an annular groove at each of at least two axially-spaced locations along the axial bore, the annular groove being concentric with, perpendicular to, and facing into, the axial bore;

an annular spring member corresponding to each annular groove and including a radially-outer portion housed in the annular groove and a radially-inner portion extending into the axial bore; and an electrical connection through the body to each annular spring member.

2. The jack socket of claim 1, wherein:

the annular spring member includes a toroidal spring member;

the toroidal coil spring has a radius and includes coils; and the coils are canted relative to the radius.

3. The jack socket of claim 2, wherein:

the body additionally defines an access port extending through the body into each annular groove; and the electrical connection comprises a printed circuit flexboard including connection fingers, one of the connection fingers extending through the access port into electrical contact with the radially outer portion of the annular spring member located in each annular groove.

4. The jack socket of claim 3, wherein:

each annular groove has a curved wall; and the one of the connection fingers is located between the curved wall of the annular groove and the radially outer portion of the annular coil member located in the annular groove.

5. The jack socket of claim 1, wherein:

the body additionally defines an access port extending through the body into each annular groove;

the electrical connection comprises a printed circuit flexboard including connection fingers, one of the connection fingers extending through the access port into electrical contact with the radially outer portion of the annular spring member located in each annular groove.

6. The jack socket of claim 5, wherein:

each annular groove has a curved wall; and the one of the connection fingers is located between the curved wall of the annular groove and the radially outer portion of the annular coil member located in the annular groove.

7. A jack socket for a phone jack, the jack socket being installable in a mounting hole and requiring no more access to the back of the mounting hole during installation than is provided by the mounting hole itself, the jack socket comprising:

a body shaped and dimensioned to be closely received by the mounting hole, the body defining:

an axial bore accessible from outside the body and including:

a plug-receiving portion adapted to receive the phone jack; and a cavity arranged in tandem with, and accessible from, the plug-receiving portion, and radial bores extending radially outwards through the body from the cavity;

a ball slidably mounted in each of the radial bores, the ball having a diameter;

an axially-movable conical wedge located in the cavity, the conical wedge having a conical surface that engages with the ball in each of the radial bores; and a thin, conductive sleeve in which the body is mounted, the sleeve defining a sleeve hole aligned with each of the radial bores, the sleeve hole having a diameter smaller than the diameter of the balls.

8. The jack socket of claim 7, in which:

the jack socket additionally comprises:

a first threaded element mounted in the body coaxially with the axial bore;

the conical wedge includes:

a second threaded element engaging with the first threaded element, and a portion adapted to receive a torque via the axial bore to rotate the conical wedge, rotation of the conical wedge causing the threaded elements to move the conical wedge axially, axial movement of the conical wedge causing the conical wedge to force the balls radially outwards into gripping engagement with the mounting hole.

* * * * *